A. A. FRANK,
TIRE FORMER OR CORE.
APPLICATION FILED JAN. 2, 1917.

1,263,400.

Patented Apr. 23, 1918
2 SHEETS—SHEET 1.

witnesses
Robert H. Weir
Arthur W. Carlson

Inventor
Arthur A. Frank
by Edwin P. H. Tower, Jr.
Atty.

A. A. FRANK.
TIRE FORMER OR CORE.
APPLICATION FILED JAN. 2, 1917.

1,263,400.

Patented Apr. 23, 1918.
2 SHEETS—SHEET 2.

UNITED STATES PATENT OFFICE.

ARTHUR A. FRANK, OF MILWAUKEE, WISCONSIN.

TIRE FORMER OR CORE.

1,263,400.                    Specification of Letters Patent.        Patented Apr. 23, 1918.

Application filed January 2, 1917. Serial No. 140,098.

*To all whom it may concern:*

Be it known that I, ARTHUR A. FRANK, a citizen of the United States, residing at Milwaukee, in the county of Milwaukee and State of Wisconsin, have invented new and useful Improvements in Tire Formers or Cores, of which the following is a specification.

This invention relates to tire formers or cores.

In the manufacture of resilient or pneumatic tires it is customary to build up a hollow structure by stretching layers of fabric or cord about a circular forming core which is removed when the tire is completed. For the production of a satisfactory tire it is essential that the layers of fabric or cord be tightly and uniformly tensioned or stretched both circumferentially and transversely in order to prevent the formation of wrinkles or buckles therein and to insure longer life and freedom from blow-outs, fabric breaks, rim cuts, and other troubles which may arise because of a non-uniform tension. The requisite circumferential tensioning is not difficult to obtain but to properly tension the layers of fabric or cord in a transverse direction presents a more serious problem.

This tensioning or stretching may be produced by initially spacing the edges of the tire from the core and subsequently forcing these edges nearer together, and the principal object of this invention is to provide an improved spacer for initially separating the tire edges from the core.

Another object is to provide a spacer in the form of a ring which may be easily and quickly applied to the core and easily and quickly removed before the core and tire are placed in the mold.

Another object is to provide a spacer which is so formed that it will also serve as a gage or seat for properly positioning the tire bead.

Another object is to provide a spacer which is simple and inexpensive to manufacture.

Another object is to provide a spacing ring which may be handled as a unit instead of in sections.

Other objects and advantages of the invention will hereinafter appear.

Two different types of the improved construction are shown in the accompanying drawings in which—

Figure 9:
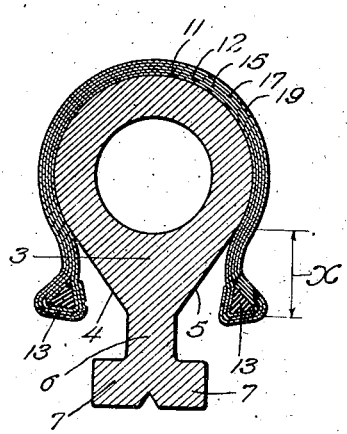
Figure 10:
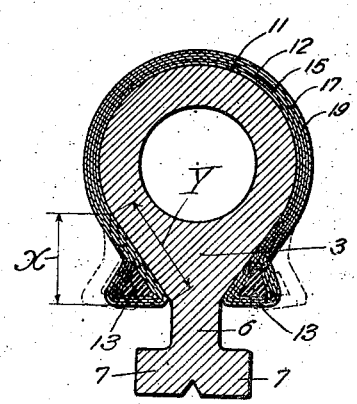

Fig. 9 is a transverse section of the core and the tire thereon illustrating the manner in which the edges of the tire remain in spaced relation with the corresponding faces of the core when the spacing rings are removed; and Fig. 10 is a view similar to Fig. 9 showing the position which the edges of the tire assume when they are forced into contact with the corresponding faces of the core by the mold.

A spacing ring constructed in accordance with the present invention may take various different forms, but only two forms are herein disclosed for the purpose of illustrating the invention.

The spacing ring is made of flexible material so shaped in cross section as to fit against the side of the core. When a ring is applied to each side of the core, they supplement the core and build out the converging faces thereof. The members thus serve temporarily as a part of the core and the edge portions of the tire are built over them. They may also serve as gages or seats for properly positioning the bead rings of the tire. Due to their inherent flexibility these rings may be readily deformed and withdrawn from the tire even after the edges thereof have been built over them. This leaves the edges of the tire standing away from the converging faces of the core proper and when they are subsequently forced against the converging faces of the core the fabric of the tire is subjected to a transverse tensioning or stretching, as will be hereinafter explained.

Figure 1:
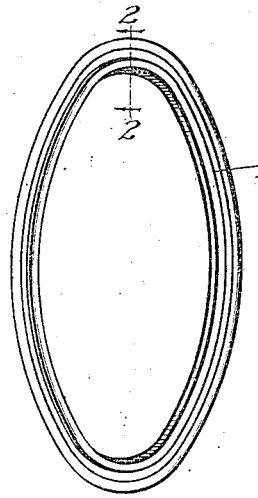
Figure 1 is a perspective view of one type of spacing ring constructed in accordance with the invention.
Figure 2:
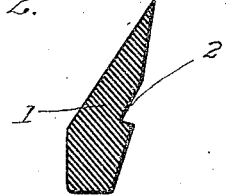
Fig. 2 is a transverse section taken on the line 2—2 of Fig. 1.

In Figs. 1 and 2 the spacing ring 1 has the general cross-sectional shape shown in Fig. 2, the groove 2 serving as a gage or seat for properly positioning the bead as will hereinafter appear.

Figure 5:
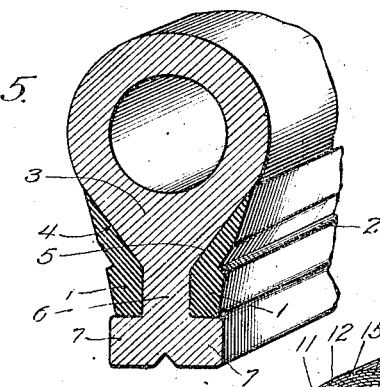
Fig. 5 is a transverse section of a core ring showing spacing rings of the type disclosed in Fig. 1 applied thereto.

In Fig. 5 spacing rings of the type illustrated in Figs. 1 and 2 are shown applied to a forming ring or core. The core 3 is of the usual construction, having converging faces 4 and 5, a web 6, and horizontally extending flanges 7. Each spacing ring is placed upon the core so that its thicker end will lie adjacent the corresponding lower flange 7 of the core and with one surface flush against the corresponding inclined face of the core as shown. It will now be readily apparent that the peculiar outline given to the ring is for the purpose of causing it to fit the core as shown in Fig. 5 and to build out or supplement the inclined faces 4 and 5.

Figure 3:
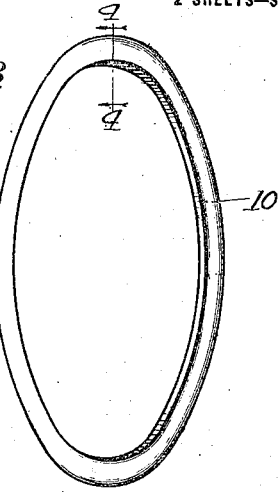
Fig. 3 is a perspective view of a different type of spacing ring.
Figure 4:
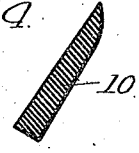
Fig. 4 is a transverse section taken on the line 4—4 of Fig. 3.
Figure 6:
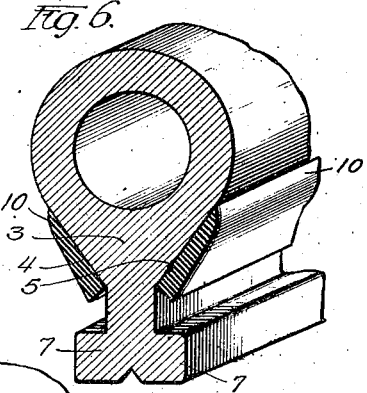
Fig. 6 is a view similar to Fig. 5 showing spacing rings of the type disclosed in Fig. 3 applied thereto.

In Figs. 3 and 4 a spacing ring 10 is shown which is substantially like that shown in Figs. 1 and 2 except that the thicker portion forming the groove is omitted. This type of ring is positioned on the core in the manner shown in Fig. 6 so that the converging faces 4 and 5 of the core will be supplemented or built out and may be used when the seat provided by the groove is not desired.

Both types of spacer above described are continuous rings of any suitable flexible material, although a broken ring may be used if desired and may in some instances prove advantageous. They may be made largely of rubber and fabric and may be molded if desired.

The process of building the tire over the core and spacing rings is substantially the same regardless of which type of ring is used, and therefore only the type shown in Figs. 1 and 2 is used in Figs. 7 to 10 inclusive to illustrate the manner of making a tire.

Figure 7:
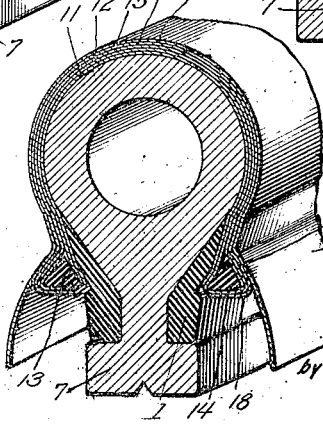
Fig. 7 is a sectional view of a core ring showing the manner of building up the tire over the core and the spacing rings.

As shown in Fig. 7, the first layer of fabric or cord 11, which may be of any desired ply and thickness, is applied to the core and its edges are smoothed down over the outer surfaces of the spacing rings 1. The lower edges of the strip are trimmed so that they will terminate approximately at the grooves 2. A second layer of fabric or cord 12 is applied to the first and is smoothed down over the same and over the outer faces of the spacing rings and into the grooves 2.

A bead ring 13 is then positioned on each side of the core. The proper position for each bead ring is clearly indicated because the groove 2 into which the fabric or cord has been pressed or may be forced forms a seat for this ring. The lower edges of the second layer of fabric are then folded outwardly around the bead rings as shown at 14. A third layer of fabric 15 is then applied to the second layer and its edges 16 are smoothed down over the outer faces of the bead rings 13. Each edge of this third layer is trimmed so that it will terminate substantially at the inner edge of the corresponding bead ring 13. A fourth layer 17 is applied in substantially the same manner as the third layer except that it is not trimmed so short as the previous layer and its edges 18 are folded under the bead rings. The top layer 19 of the fabric is smoothed down over the previous layer but its edges 20 are left free to constitute flaps which are folded inwardly after the spacing rings are removed. While five layers of fabric or cord have been illustrated and described it is, of course, understood that this number may be varied as desired.

Figure 8:
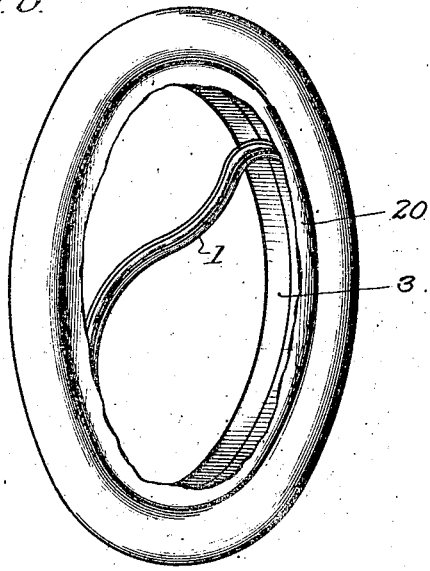
Fig. 8 is a perspective view showing the manner in which the spacing rings are removed before the core and the tire are placed in the mold.

The next operation is to remove the spacing rings. This may readily be done, since they are flexible, by prying out a portion of each ring until it can be gripped with the hand. Each ring may then be removed by simply pulling it from under the overlying edge of the tire as shown in Fig. 8.

After the spacing rings are removed the edges of the tire will remain in spaced relation to the converging faces 4 and 5 of the core as shown in Fig. 9. The depending flaps 20 are then folded inwardly around the bead rings 13 in the manner also indicated in Fig. 9.

When the core with the tire thereon is placed in the mold the pressure applied to the mold during the vulcanizing process will force the edges of the tire toward the converging faces 4 and 5 of the core. As the bead rings 13 are substantially rigid and inextensible they will move in a substantially straight line toward the core to the full-line position shown in Fig. 10. This will obviously produce a transverse stretching of all the layers of fabric because the distance X is less than the distance Y.

It will be apparent that the spacing ring of this invention is very simple and inexpensive to manufacture. It efficiently performs its duty of keeping the edges of the tire spaced from the converging faces of the core and may be readily removed by simply pulling it from the core without first unloosening any bolts or other fastening devices. As the ring is flexible and can be readily removed it may be made in one piece or continuous and therefore it may be handled as a unit. The ring is light and easily handled and may be very quickly applied to the side of the core and quickly removed.

It will be understood that the spacing rings disclosed are merely illustrative of the invention and that they may take various other forms without departing from the spirit and scope of the invention as defined in the accompanying claims.

What I claim is:

1. A flexible spacer for use in the manufacture of tires formed to separate the tire from the core.

2. A flexible spacer for use in the manufacture of tires for separating the edges of the tire from the core prior to vulcanization.

3. A spacer for use in the manufacture of tires comprising a one-piece ring formed to fit the side of the core and separate the edge of the tire therefrom.

4. A spacer for use in the manufacture of tires comprising a continuous ring capable of being distorted and formed to separate the tire from the core.

5. A spacer for use in the manufacture of tires comprising a ring of molded flexible material formed to lie between and separate the tire and core prior to vulcanization.

6. The combination with a core for use in the manufacture of tires of a flexible spacing ring adapted to be applied to the side of the core to separate the edge of the tire therefrom.

7. The combination with a core for use in the manufacture of tires of a one-piece spacing ring adapted to be applied to the side of the core and separate the tire from the core prior to vulcanization.

8. The combination with a core for use in the manufacture of tires of a one-piece spacing ring formed to be applied to the side of the core to separate the tire therefrom and capable of being distorted to remove it from the tire.

9. The combination with a core for use in the manufacture of tires of a spacing ring adapted to be applied to the side of the core so that the edge of the tire may be built over the same, said ring being distortable so that it may be readily removed from under the edge of the tire.

10. A spacing ring for use in the manufacture of tires comprising a ring of flexible material adapted when positioned on the core to provide a seat for the tire bead and to separate the tire from the core prior to vulcanization.

11. A spacing ring for use in the manufacture of tires comprising a continuous ring capable of being laid flat against the side of the core to separate the tire therefrom and to provide a seat for the tire bead.

12. A tire former comprising in combination a core, and a one-piece spacing ring placed on the side thereof and over which an edge of the tire may be placed, the ring being removable to leave a space between the core and tire edge so that the edge may be moved toward the core to tension the tire.

13. A tire former comprising a core, and a pair of one-piece spacing rings, one placed in each side of the core to separate the edges of the tire from the core and being removable so that the tire edges may be moved toward the core to tension the tire.

14. A tire former comprising a core, a flexible spacing ring placed on the side thereof to separate an edge of the tire from the core and being removable to leave a space between the tire edge and the core so that the tire may be put under tension by moving the tire edge toward the core.

15. A tire former comprising a core, two flexible spacing rings, one to be placed on each side of the core to separate the edges of the tire from the core and being removable, leaving a space between the tire edges and core so that the tire may be put under tension by moving both tire edges toward the core.

16. In an apparatus for making tire casings, a rigid core to support a casing during the laying up process thereof, and during the process of vulcanization, and means relatively compressible to afford a false exterior shape to said core prior to the said process of vulcanization.

17. In an apparatus for making tire casings, a rigid core to support a casing during the laying up process thereof, and during the process of vulcanization, and flexible, non-metallic pads adapted to prevent close conformation of the casing to the core prior to the process of vulcanization.

18. In an apparatus for making tire casings, a rigid core to support a casing during the process of laying the casing up thereon and during the process of vulcanization of the casing, annular pockets being formed in the core for accommodation of the casing toe flanges during the said vulcanization process, and relatively compressible means to prevent the entrance of the casing toe flanges into said core pockets during the said laying up process.

19. In an apparatus for making tire casings, a rigid core formed with lateral annular pockets, said core being adapted to support a tire casing during both the laying up and vulcanizing processes of the tire, and flexible means receivable in said core pockets so that the casing side walls may be laid up thereover in tangential dependence from the core, said flexible means being removable from the core pockets prior to the commencement of the vulcanizing process.

20. In an apparatus for making tire casings, a rigid core shaped to fit the interior of a finished tire casing, and pads in conformity to portions of the core to space the toe flanges of the tire casing from the said core portions during the laying up process of the casing, said pads being compressible to admit of removal without deformation of the casing, immediately prior to the vulcanizing process of the latter.

21. In an apparatus for making tire casings, a rigid core formed with lateral annular pockets at the junction of the transverse core circumference with the core web substantially as described, and relatively deformable pads secured within respective pockets, each pad having a surface tangential to the transverse core circumference.

22. In an apparatus for making tire casings, a rigid core formed with lateral annular pockets at the junction of the transverse core circumference with the core web, substantially as described, and relatively deformable pads conforming to respective pockets, each pad presenting an oblique face outwardly to engage the corresponding toe flange of a tire casing laid up upon said core.

In witness whereof, I have hereunto subscribed my name in the presence of two witnesses.

ARTHUR A. FRANK.

Witnesses:
R. O. HINKLE,
BERTHA L. COXE.